United States Patent
Solovay et al.

(10) Patent No.: US 7,290,915 B2
(45) Date of Patent: Nov. 6, 2007

(54) LIGHT COUPLING ASSEMBLY

(76) Inventors: Kenneth S. Solovay, 16732 Diamond Dr., Weston, FL (US) 33331; James H. Layer, 10427 SW. 49th Pl., Cooper City, FL (US) 33328; Thomas P. Jacobs, 4300 N. Ocean Blvd., #6, Delray Beach, FL (US) 33483; Gregory Madden, 2619 Sea Island Dr., Fort Lauderdale, FL (US) 33301

(*) Notice: Subject to any disclaimer, the term of this patent is extended or adjusted under 35 U.S.C. 154(b) by 901 days.

(21) Appl. No.: 10/646,220

(22) Filed: Aug. 22, 2003

(65) Prior Publication Data
US 2004/0032751 A1  Feb. 19, 2004

Related U.S. Application Data

(63) Continuation-in-part of application No. 09/910,191, filed on Jul. 20, 2001, now Pat. No. 6,648,902.

(60) Provisional application No. 60/405,291, filed on Aug. 23, 2002.

(51) Int. Cl.
*F21V 29/00* (2006.01)
(52) U.S. Cl. .................. 362/580; 362/572; 362/581
(58) Field of Classification Search ........... 362/551, 362/572, 580–581; 385/147, 39, 78, 117, 385/135
See application file for complete search history.

(56) References Cited

U.S. PATENT DOCUMENTS

| 2,376,448 | A | 5/1945 | Neugass |
| 3,287,547 | A | 11/1966 | Spedding |
| 3,614,414 | A | 10/1971 | Gores |
| 4,096,864 | A | 6/1978 | Kletschka et al. |
| 4,165,746 | A | 8/1979 | Kletschka et al. |
| 4,671,283 | A | 6/1987 | Hoskin et al. |
| 5,190,028 | A | 3/1993 | Lafferty et al. |
| 5,250,046 | A | 10/1993 | Lee |
| 5,318,589 | A | 6/1994 | Lichtman |
| 5,342,375 | A | 8/1994 | Lemole |
| 5,569,300 | A | 10/1996 | Redmon |

(Continued)

FOREIGN PATENT DOCUMENTS

DE  42 34 050 A1  6/1993

(Continued)

OTHER PUBLICATIONS

Form PCT/ISA/210, International Search Report for PCT/US01/23026 mailed Feb. 1, 2002.

*Primary Examiner*—Ali Alavi
(74) *Attorney, Agent, or Firm*—Lott & Friedland, P.A.; Michael J. Keller (57) ABSTRACT

A light coupling assembly that couples a light source to a light conducting system attached to a medical instrument so that light from the light source is transmitted to a surgical site. The light coupling assembly according to the present invention includes a member formed of a heat conducting material that receives and transfers heat from the light source to a light source housing. The light coupling assembly also includes an insulating member that receives a portion of the heat conducting member and prevents an attendant from being injured by the heat generated by the light source and carried by the heat conducting member.

18 Claims, 6 Drawing Sheets

U.S. PATENT DOCUMENTS

| | | |
|---|---|---|
| 5,655,100 A | 8/1997 | Yoon |
| 5,667,473 A | 9/1997 | Finn et al. |
| 5,667,478 A | 9/1997 | McFarlin et al. |
| 5,868,668 A | 2/1999 | Weiss |
| 5,916,149 A | 6/1999 | Ryan, Jr. |
| 5,967,653 A * | 10/1999 | Miller et al. .................. 362/580 |
| 6,089,741 A * | 7/2000 | Chen et al. .................. 362/583 |
| 6,129,662 A | 10/2000 | Li et al. |
| 6,176,824 B1 | 1/2001 | Davis |
| 6,185,356 B1 | 2/2001 | Parker et al. |
| 6,302,571 B1 * | 10/2001 | Davenport et al. .......... 362/580 |
| 6,422,730 B1 * | 7/2002 | Koren et al. ................. 362/580 |
| 6,905,214 B2 * | 6/2005 | Tani ............................... 353/56 |
| 6,942,372 B1 * | 9/2005 | Davis ........................... 362/580 |

FOREIGN PATENT DOCUMENTS

| | | |
|---|---|---|
| WO | WO 90/10420 | 9/1990 |
| WO | WO 99/01696 | 1/1999 |

* cited by examiner

LIGHT COUPLING ASSEMBLY

CROSS REFERENCES TO RELATED APPLICATIONS

This application is a continuation-in-part of U.S. application Ser. No. 09/910,191, filed Jul. 20, 2001 now U.S. Pat. No. 6,648,902, and claims the benefit of U.S. Provisional Application No. 60/405,291, filed Aug. 23, 2002.

STATEMENT REGARDING FEDERALLY SPONSORED RESEARCH OR DEVELOPMENT

Not Applicable

BACKGROUND OF THE INVENTION

1. Field of the Invention

The present invention relates to a coupling assembly for a light transmission system, more specifically, the present invention relates to a light adapter assembly for coupling a light source to a medical instrument.

2. Description of the Related Art

Lighting systems including high intensity light sources and systems for transmitting the light from these high intensity light sources to medical instruments are known. Typically, the light transmitting systems include light pathways formed by one or more fiber-optic cables. These fiber-optic cables are constructed from a light conducting material such as glass or plastic. Each medical instrument then directs and focuses the received light onto a particular area of a patient's anatomy in order to illuminate a portion of the patient's body where a medical procedure is being performed. Many types of coupling assemblies have been developed for delivering light from the high intensity light sources to the light transmitting systems coupled to the medical instruments.

Initially, traditional coupling assemblies position a proximal end of the fiber-optic light transmitting pathway approximately at a point inside the light source where the light is most concentrated. Although this positioning of the fiber-optic cables proximate the light source maximizes the collection of light energy, energy from the light source is absorbed and accumulated by the coupling assemblies and the fiber optic cables as heat energy. As a result, the traditional coupling assemblies often become very hot, which is a hazard to people working with the optical illumination systems. Additionally, the heating of the coupling assemblies also degrades the performance of the system by distorting the transmitted light energy and potentially damaging the fiber-optic light guide.

Contemporary coupling assemblies attempt to space the fiber-optic cable or bundle of fiber-optic cables away from the heat of the light source that can be four hundred degrees Celsius or greater. An example of a contemporary prior art coupling assembly is disclosed in U.S. Pat. No. 5,099,399 to Miller et al. This coupling assembly includes an outer coupling member that extends away from a light source housing and that has a first end that receives a bundle of fiber optic cables. The bundle has a second end secured into a medical instrument. The outer coupling member is formed of a heat conducting material and includes a plurality of ventilation fins along its length for dissipating heat generated by the light source. However, the heat conducting coupling member can reach temperatures during a medical procedure that will cause injury to any person that touches it. The level of heat carried by the coupling member makes it unable to be touched during a medical procedure without causing the attendant to stop what she is doing and put on a thermally insulated glove. This extra step will increase the amount of time required to remove the coupling member. Additionally, if the attendant does not remember about the high temperature of the coupling member, she may grasp it without putting on the thermally insulated glove. This will result in her injury and possible need to leave the operation room, thereby reducing the number of attendants available during the procedure.

As a result, there exists a present need for a coupling assembly that effectively prevents the light transmitting pathways from being damaged by transferring heat generated by a light source away from the light transmitting pathways, and that isolates the heat transferred from the light source from an outer surface of the coupling assembly so that a person will not be injured if the coupling assembly is touched during the operation of the light source.

BRIEF SUMMARY OF THE INVENTION

One aspect of the present invention relates to a light coupling assembly that couples a light source to a light conducting system attached to a medical instrument so that light from the light source is transmitted to a surgical site. The light coupling assembly according to the present invention includes a member formed of a heat conducting material that receives and transfers heat from the light source to a light source housing. The light coupling assembly also includes an insulating member that receives a portion of the heat conducting member and prevents an attendant from being injured by the heat generated by the light source and carried by the heat conducting member.

The light coupling assembly includes a first member for being secured to a light source housing and a second member for receiving at least a portion of the first member. The first member is formed of a heat conducting material, and the second member is formed of a heat insulating material. The second member is securely connected to the first member such that at least a portion of the second member surrounds a portion of the first member. The assembly further includes a light transmitting member that extends within the first member and the second member for delivering light from a light source when the first member is positioned proximate the light source.

The present invention also includes an assembly for coupling a light source to a light transmitting system that illuminates a surgical site. The assembly includes a first member that has a first end for positioning proximate the light source. The first member is formed of a heat conducting material. The assembly also includes a second member formed of a heat insulating material. The second member receives a portion of the first member and prevents heat carried by the received portion of the first member from being transferred through the second member to an attendant during the operation of the light source. The assembly further includes a light transmitting member that extends within the first member and the second member for delivering light from the light source when the first member is positioned proximate the light source.

DETAILED DESCRIPTION OF THE INVENTION

Figure 1:
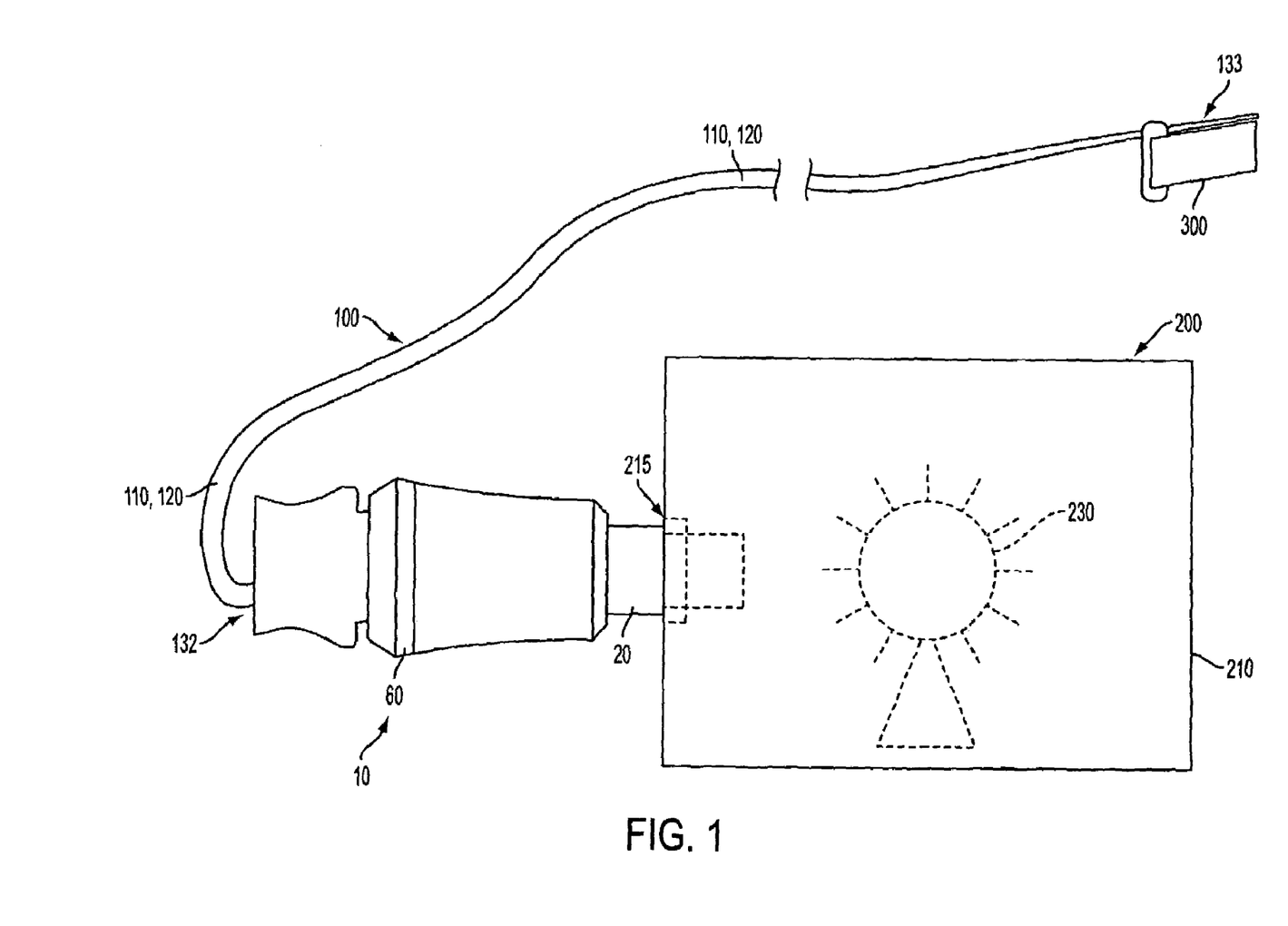
FIG. 1 illustrates a lighting system for a medical instrument including a light coupling assembly according to the present invention.
Figure 5:
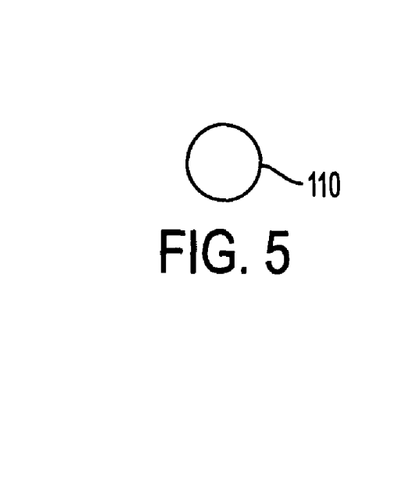
FIGS. 5 and 6 are cross sections of light transmitting systems that can be used with the light coupling assembly of the present invention.
Figure 6:
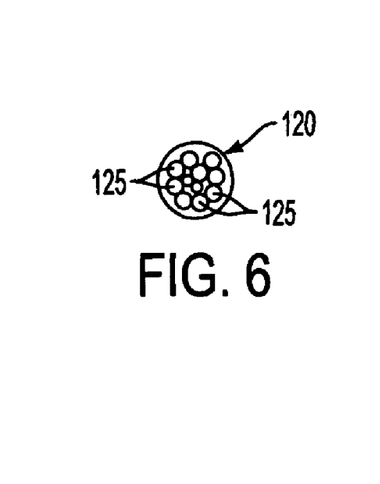

The present invention includes a light coupling assembly 10 that couples a light source 200 to a light transmitting system 100 having a light input end 132 and a light output end 133 as shown in FIG. 1. In a first embodiment, the light transmitting system 100 includes a fiber-optic cable 110, as shown in cross-section in FIG. 5, which carries light to a medical instrument 300. In an alternative embodiment, the light transmitting system 100 includes a bundle 120 of fiber-optic cables 125, as shown in cross-section in FIG. 6, which carry light to a medical instrument 300. These fiber-optic cables 110, 125 are formed of well-known light conducting materials such as glass or plastic. These conducting materials are of the type that transmit light with very low losses and that are also typically damaged by exposure to heat at relatively low temperatures. Additionally, the fiber-optic cables 110, 125 are generally circular in cross-section. As will be seen hereinafter, and in accordance with the present invention, the light coupling assembly 10 is configured in a way that isolates the fiber-optic cables 110, 125 from heat that can damage them when the light source 200 is operating.

As shown in FIG. 1, the output end 133 of the light transmitting system 100 is secured along a portion of a medical instrument 300. In one embodiment, the medical instrument 300 includes a pair of forceps. The medical instrument 300 could also include a pair of clamps or a retractor. In an alternative embodiment, the medical instrument 300 includes an endoscope. It is to be understood that other medical instruments, in addition to those discussed herein, may be used as part of the system of the present invention.

The light source 200 includes a light source housing 210 and a light-generating member 230 that produces the light delivered to the light transmitting system 100. In one embodiment, the light-generating member 230 comprises an arc lamp. In a first embodiment, the arc lamp includes a xenon lamp as is known in the art. In alternative embodiments, the arc lamp includes a metal-halide lamp, a HID lamp or a mercury lamp. The arc lamps usable with the present invention produce a high intensity light energy that can effectively illuminate a remote surgical site where the medical instrument 300 is used. In alternative embodiments, the light-generating member 230 can include one or more filament lamps such as known halogen lamps. Other known light sources can also be used to generate light that will be transmitted to a medical instrument by the light coupling assembly 10 and the light transmitting system 100. The light source 200 can also include various optical collection and condensation systems (not shown) that include various lenses, mirrors, and filters positioned within the housing 210 proximate the light-generating member 230 as is known in the art.

No matter the embodiment, the above-discussed light-generating member 230 is an intense emitter of light and a significant source of heat (400 degrees Celsius or more). As is known, the heat generated by the light-generating member 230 can damage the fiber-optic light conducting cables 110, 125 and any light-conducting member positioned proximate the light-generating member 230.

Figure 2:
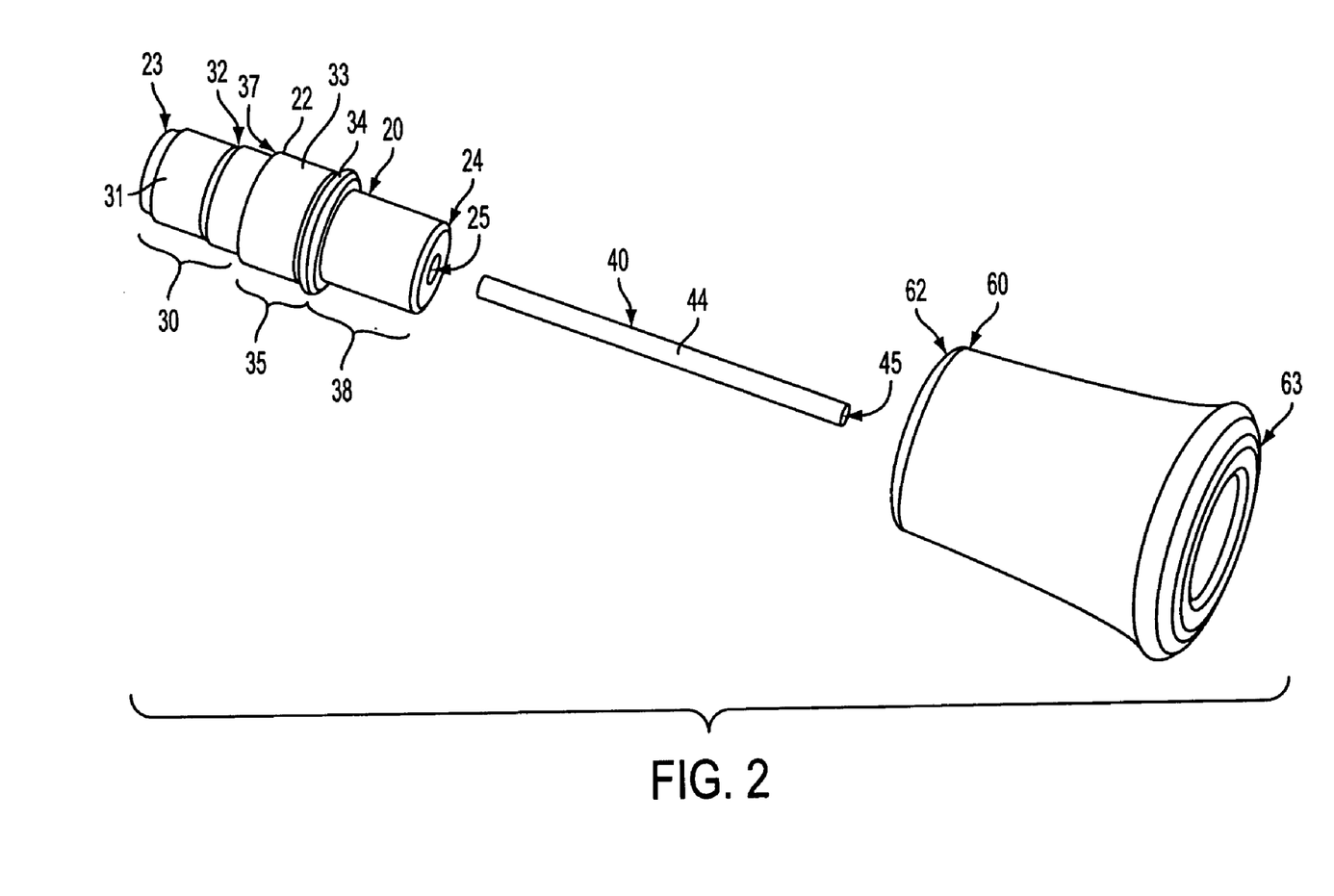
FIG. 2 is an exploded isometric view of the light coupling assembly shown in FIG. 1.

FIG. 2 illustrates the light coupling assembly 10 that includes an adapter 20, a light carrying member 40 and an insulating member 60. The adapter 20 is formed from a heat conductive material such as, for example, aluminum or an aluminum alloy. In another embodiment, the adapter 20 is formed of a heat conducting metal such as stainless steel. Other heat conducting metals that will not deform in the presence of the heat generated by the light-generating member 230 can also be used to form the adapter 20. In yet another embodiment, the adapter 20 is formed of a heat conducting plastic or similar material that is capable of conducting heat received by the adapter 20 to the light source housing 210. Other heat conductive materials may be used in accordance with the present invention. The function of the heat conductive material is discussed below.

The adapter 20 includes an elongated body 22 having a first end 23 and an opposing second end 24 as illustrated in FIGS. 2, 3, 8A and 8B. The adapter 20 also includes an elongated lumen 25 that extends along its length between the opposing first and second ends 23, 24. The lumen 25 has a substantially circular cross section that extends in a plane that lies perpendicular to a length of the adapter 20. However, the cross section of the lumen 25 is not limited to being circular. Instead, the cross section of the lumen 25 can be formed in an oval shape, elliptical shape or other shapes that have three or more sides, such as a triangle, rectangle, pentagon, etc. The adapter 20 also includes a first section 30 that is received within the light source housing 210, a second section 35 that is located outside the light source housing 210 and a third section 38 that extends within the insulating member 60 as discussed below. In a preferred embodiment, the adapter 20 has an overall length of between about 22 mm and about 26 mm, preferably about 24.1 mm. In this preferred embodiment, the lumen 25 has a diameter of between about 1.5 mm and 2.5 mm, preferably about 1.75 mm.

Figure 8A:
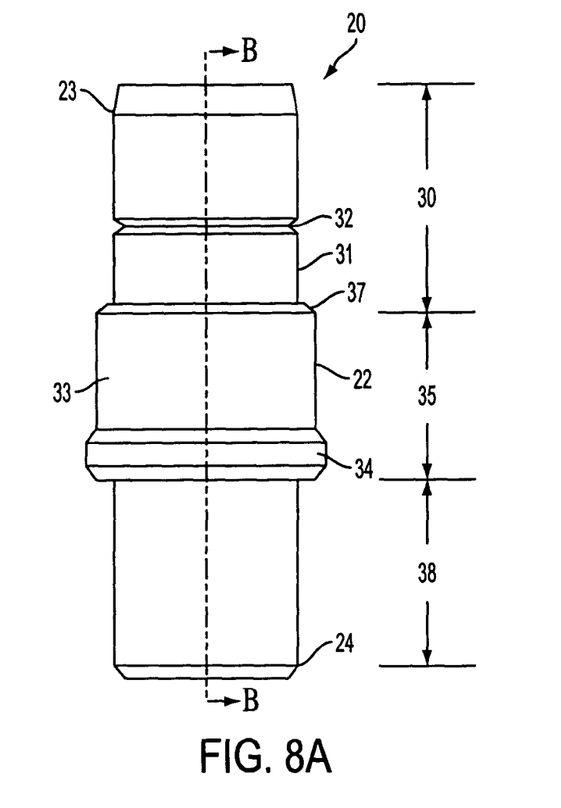
FIGS. 8A and 8B illustrate the adapter shown in FIG. 1.
Figure 8B:
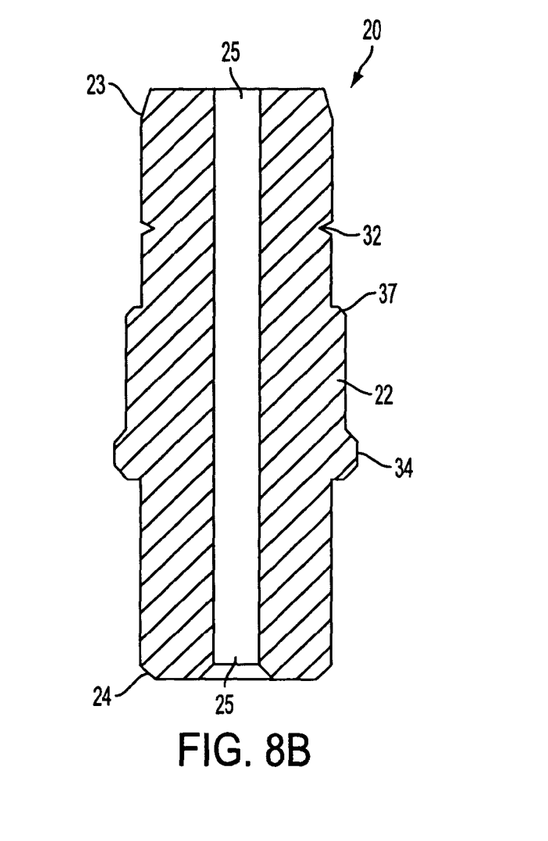

As illustrated in FIGS. 2, 8A and 8B, the first section 30 includes the first end 23, a plug-in portion 31 including a circumferential groove 32 that engages with a member inside the light source housing 210 or a portion of the light source housing 210 surrounding the opening 215 in which the plug-in portion 31 is positioned. In a preferred embodiment and as shown in FIG. 1, the light source housing 210 has an opening 215 through which the plug-in portion 31 is inserted and the groove 32 is engaged so that the first end 23 of the adapter 20 is located proximate the light-generating member 230. In an alternative embodiment, the plug-in portion 31 includes threads that engage with the light source housing 210 or a threaded member within the light source housing 210. The plug-in portion 31 has a diameter that is sized so that the plug-in portion 31 can be positioned and secured with in the light source housing 210. As a result, the diameter of the first end 23 will vary depending on the size of the opening 215 in the light-source housing 210 and the light-generating member 230.

The second section 35 includes a grasping section 33 and circumferential ring 34 that engages the insulator 60 as discussed below. The grasping section 33 extends outside the light source housing 210 so that the adapter 20 can be grasped and removed from the light-source housing 210 when needed. The grasping section 33 has a larger diameter than the plug-in portion 31. As a result, a circumferential shoulder (ridge) 37 extends between the plug-in portion 31 and the grasping section 33 to prevent the grasping section 33 from extending into the light source housing 210.

Figure 3:
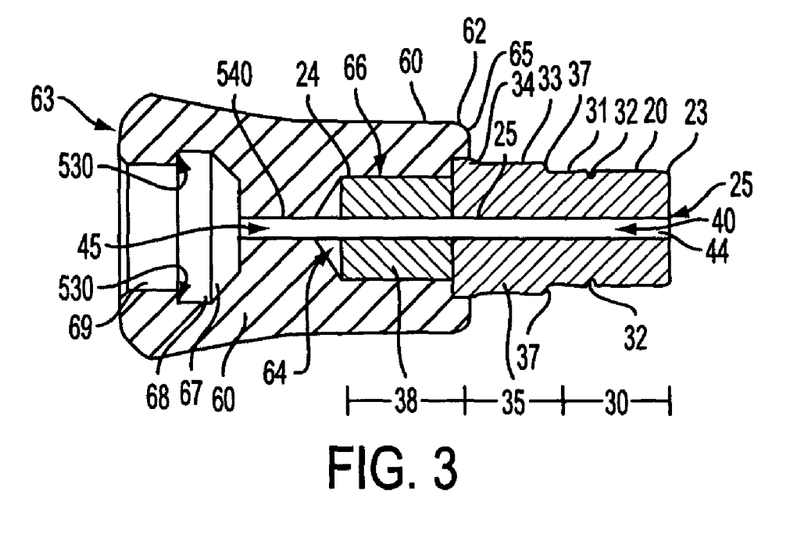
FIG. 3 is a cross section of the light coupling assembly.
Figure 7A:
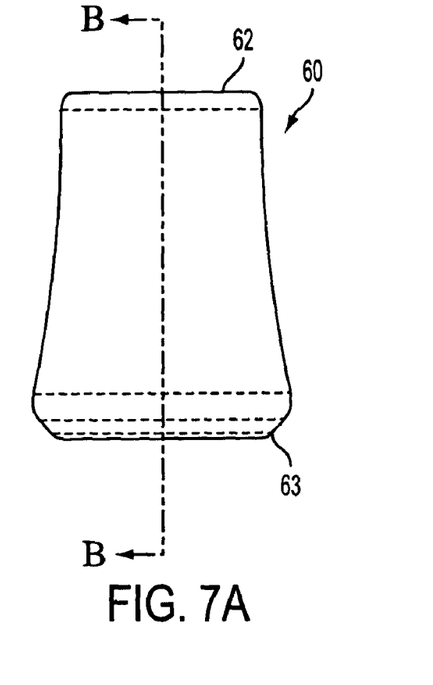
FIGS. 7A and 7B illustrate the insulating member shown in FIG. 1.
Figure 7B:
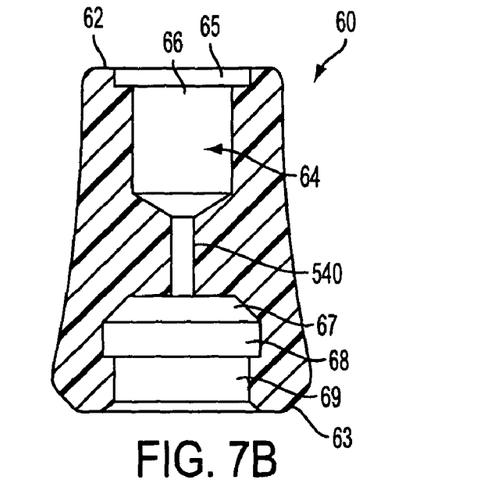

As shown in FIGS. 3, 7A and 7B, the insulating member 60 is formed of a heat insulating material such as rubber, plastics or other known polymers. In one embodiment, the insulating member 60 is formed of DELRIN. However, other known heat insulating materials can be used. In a preferred embodiment, the insulating member 60 has a length of between about 22 mm and about 26 mm, preferably about 24.8 mm.

Figure 4A:
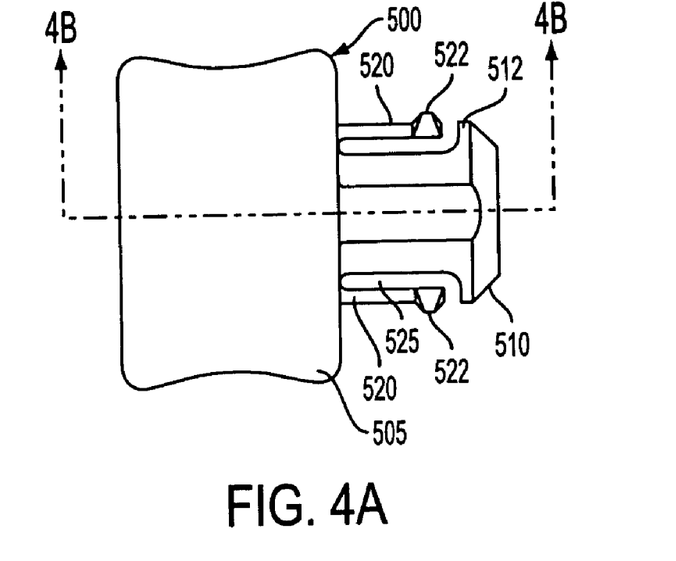
FIG. 4A illustrates a plug for connecting a light transmitting system to an end of the light coupling assembly.

The insulating member 60 includes a first end 62 for receiving the adapter 20, a second end 63 for receiving a light-connecting plug 500, shown in FIG. 4A, and a central lumen 540 that extends between the ends 62, 63. An adapter receiving recess 64 extends inwardly within the insulating member 60 from the first end 62 as shown in FIG. 3. The recess 64 includes a first portion 65 that receives and holds the ring 35 and a second portion 66 that receives and removably houses the third section 38 of the adapter 20 so that the third section 38 is thermally isolated when positioned within the insulating member 60. As a result, no heat from the adapter 20 is conducted to an outer surface of the insulating member 60 or an attendant touching the insulating member 60 during the operation of the light-generating member 230. In an alternative embodiment (not shown) the insulating member 60 can include circumferential positioned external grasping members spaced along its length that assist in the grasping of the insulating member 60.

As discussed above, the second end 63 removably receives the connecting plug 500 in the input end 132 of the light transmitting system 100. The second end 63 includes a first section 67, a second section 68 and a third section 69. Cross sections of these sections 67-69 are the same as that of the connecting plug 500 shown in FIGS. 4A and 4B. These cross sections can be any of those discussed above. The first section 67 has a tapered portion for receiving a forward tapered portion 510 of the plug 500. A lower portion of the tapered section 67 has a diameter that is the same as that of the second section 68. The third section 69 has a diameter that is smaller than that of the second section 68.

Figure 4B:
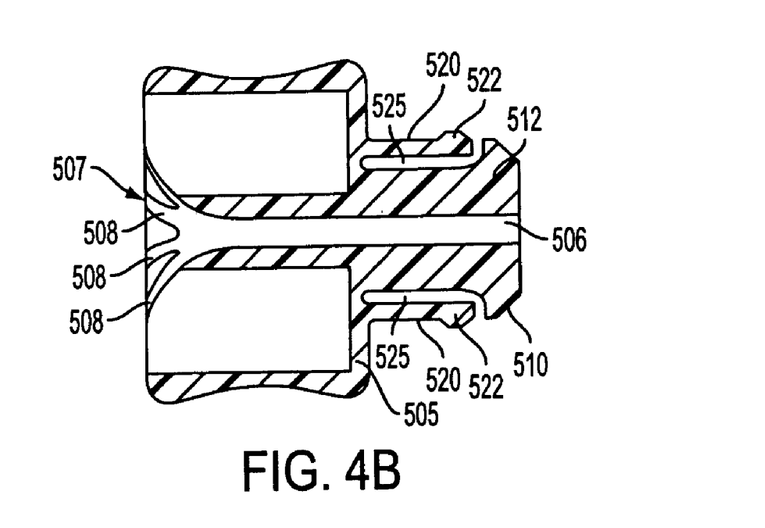
FIG. 4B is a cross section of the plug shown in FIG. 4A.

The plug 500 shown in FIGS. 4A and 4B includes a body 505 with an elongated central lumen 506 that receives the input end of the light-transmitting member 100. In one embodiment, an end 507 of the central lumen 506 includes a plurality of grooves 508 for receiving the cables 125. A central cylindrical portion 512 of the body 505 surrounds the lumen 506. The body 505 also includes resilient prongs 520 that include projections 522 that extend in a direction away from the lumen 506. The prongs 520 are spaced from the central cylindrical portion 512 by gaps 525. As the plug 500 enters the insulating member 60, the projections 522 move along the wall of the third section 69 and are deflected into the gaps 525. As the projections 522 enter the second section 68, the prongs 520 deflect away from the lumen 506 and toward the wall of the second section 68. The projections 522 engage a shoulder 530 between the second and third sections 68, 69. As a result, the plug 500 is securely held within the insulating member 60.

As shown in FIGS. 2 and 3, the light carrying member 40 extends through adapter 20 and the insulating member 60. In a preferred embodiment, the light carrying member 40 includes an elongated cylindrical member 44 having a longitudinally extending internal lumen 45. The cylindrical member 44 can be formed of a glass or ceramic material that transmits light and not heat. In an alternative embodiment, the cylindrical member 44 can be formed of any material that conducts light, but that does not conduct an amount of heat that could damage the cables 110, 125. As a result, the cylindrical member 44 acts as a heat isolator and prevents the heat from the light-generating member 230 from damaging the cables 110, 125. In a preferred embodiment, the light carrying member 40 has a length of between about 30 mm and about 33 mm, preferably about 31.8 mm. In this preferred embodiment, the light carrying member 40 also has a diameter of between about 1.5 mm and 1.7 mm, preferably 1.57 mm.

As discussed above, the adapter 20 is formed of a heat conducting material. As a result, the non-heat conducting material of the cylindrical member 44 and the heat conducting material of the adapter 20 transfer the heat generated by the light-generating member 230 to the housing 210 and not the light transmitting system 100. Therefore, during the operation of the light-generating member 230, the heat transferred to the housing 210 is effectively dissipated over the large surface area of the housing 210 and thereby drawn away from the light transmitting system 100 and eliminated without causing anyone who contacts the housing 210 any heat related injury.

It is to be understood that the invention is not limited in its application to the details of construction and to the arrangements of the components set forth in the above description or illustrated in the drawings. Numerous modifications and changes will be readily apparent to one of ordinary skill in the art. For example, the above listed dimensions can change depending on the medical instrument used with the light source and the area of the body being illuminated. Also, it is to be understood that the phraseology and terminology employed herein are for the purpose of description and should not be regarded as limiting.

What is claimed is:

1. A light coupling assembly comprising:
   a first member for being secured to a light source housing, said first member being formed of a heat conducting material;
   a second member formed of a heat insulating material, said second member being securely connected to said first member such that at least a portion of said first member is at least partially surrounded by said second member; and
   a light transmitting member extending within said first member and said second member for delivering light from a light source when the first member is positioned proximate the light source.

2. The light coupling assembly of claim 1 wherein said first member includes a portion for extending into the light source housing proximate the light source when the first member is secured to the light source housing.

3. The light coupling assembly of claim 2 wherein the first member includes a securing member for engaging a portion of the light source housing to hold the light coupling assembly relative to the light source housing during the operation of the light source.

4. The light coupling assembly of claim 1 wherein the first and second members each include an internal lumen for receiving a portion of the light transmitting member.

5. The light coupling assembly of claim 1 wherein said light transmitting member extends between a light receiving end of the first member and a point along said second member spaced from an end of the second member opposite the first member.

6. The light coupling assembly of claim 1 wherein said second member includes an internal recess for engaging and securely receiving a member secured to a light transmitting system.

7. The light coupling assembly of claim 1 wherein said light transmitting member is formed of a material with poor thermal conduction properties.

8. The light coupling assembly of claim 7 wherein said material with poor thermal conduction properties includes a ceramic or a glass.

9. The light coupling assembly of claim 1 wherein an external surface of said second member includes a plurality of grasping members.

10. An assembly for coupling a light source to a light transmitting system for illuminating a surgical site, comprising:
a first member having a first end for positioning proximate the light source, said first member being formed of a heat conducting material;
a second member formed of a heat insulating material, said second member receiving a portion of said first member and preventing heat carried by said received portion of said first member from being transferred through said second member during the operation of the light source; and
a light transmitting member extending within said first member and said second member for delivering light from the light source when the first member is positioned proximate the light source.

11. The assembly of claim 10 wherein said received portion of the first member further includes an internal lumen aligned with an internal lumen of the second member, each said internal lumen receiving a portion of said light transmitting member.

12. The assembly of claim 11 wherein said light transmitting member includes an elongated member formed of a light conducting material.

13. The assembly of claim 10 wherein the first member includes a first portion for positioning within a light source housing, said first portion having a securing member for engaging a portion of the light source housing to securely hold the assembly relative to the light source housing during the operation of the light source.

14. The assembly of claim 10 wherein an exterior portion of the second member includes a plurality of adjacent grasping members.

15. The assembly of claim 10 wherein said light transmitting member extends between a light receiving end of the first member and a point along said second member spaced from an end of the second member opposite the first member.

16. The assembly of claim 15 wherein said second member includes an internal recess for engaging and securely receiving a member secured to a light transmitting system.

17. The assembly of claim 15 wherein said light transmitting member is formed of a material with poor thermal conduction properties.

18. The assembly of claim 17 wherein said material with poor thermal conduction properties includes a ceramic or a glass.

* * * * *